US010538416B2

(12) United States Patent
Schedl (10) Patent No.: US 10,538,416 B2
(45) Date of Patent: Jan. 21, 2020

(54) DRIVE SYSTEM FOR A PEOPLE CONVEYOR

(71) Applicant: Otis Elevator Company, Farmington, CT (US)

(72) Inventor: Philipp Schedl, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/413,095

(22) Filed: May 15, 2019

(65) Prior Publication Data
US 2019/0352138 A1 Nov. 21, 2019

(30) Foreign Application Priority Data

May 16, 2018 (EP) ..................................... 18172722

(51) Int. Cl.
*B66B 23/02* (2006.01)
*F16G 13/02* (2006.01)
*F16G 15/12* (2006.01)
*B66B 21/10* (2006.01)
*B66B 21/02* (2006.01)

(52) U.S. Cl.
CPC .......... *B66B 23/022* (2013.01); *B66B 23/024* (2013.01); *B66B 23/026* (2013.01); *B66B 23/028* (2013.01); *F16G 13/02* (2013.01); *F16G 15/12* (2013.01); *B66B 21/02* (2013.01); *B66B 21/10* (2013.01)

(58) Field of Classification Search
CPC ... B66B 23/022; B66B 23/024; B66B 23/028; F16G 13/02

USPC ........ 198/330, 332, 832, 837; 474/155, 156, 474/157
See application file for complete search history.

(56) References Cited

U.S. PATENT DOCUMENTS

| 4,413,719 | A | 11/1983 | White |
| 4,569,433 | A | 2/1986 | Ishida et al. |
| 4,884,673 | A | 12/1989 | Rivera |
| 4,953,685 | A | 9/1990 | Johnson |
| 5,170,875 | A * | 12/1992 | Kubota .................. B66B 23/02 198/328 |
| 5,184,710 | A * | 2/1993 | Nakatani ................ B66B 21/06 198/328 |

(Continued)

FOREIGN PATENT DOCUMENTS

| CN | 107580584 A | 1/2018 |
| DE | 2346266 A1 | 3/1975 |

(Continued)

OTHER PUBLICATIONS

European Search Report for application 181872722.3, Jan. 31, 2019, 7 pages.

*Primary Examiner* — Joseph A Dillon, Jr.
(74) *Attorney, Agent, or Firm* — Cantor Colburn LLP (57) ABSTRACT

A drive system (35) for a people conveyor (1) comprises a conveyance chain (15) including a plurality of chain links (36) connected to each other; a plurality of legs (38) configured for connecting the conveyance chain (15) with the conveyance elements (13); and a plurality of levers (40). Each leg (38) is connected to at least two different chain links (36) by at least two of the levers (40). Each of the levers (40) is pivotably connected to one of the chain links (36) and pivotably connected to one of the legs (38).

15 Claims, 7 Drawing Sheets

(56) References Cited

U.S. PATENT DOCUMENTS

| | | | |
|---|---|---|---|
| 5,242,042 A | 9/1993 | Mauldin | |
| 6,685,003 B2 * | 2/2004 | Copeland | B66B 23/022 198/326 |
| 6,988,608 B2 * | 1/2006 | Pietz | B66B 23/022 198/326 |
| 7,159,705 B2 | 1/2007 | Ogimura et al. | |
| 7,222,713 B2 | 5/2007 | Hauer et al. | |
| 7,604,108 B2 * | 10/2009 | Gonzalez Alemany | B66B 23/02 198/325 |
| 8,636,134 B2 | 1/2014 | Fargo | |
| 8,701,861 B2 | 4/2014 | Turek et al. | |
| 8,757,350 B2 | 6/2014 | Ye et al. | |
| 8,931,614 B2 | 1/2015 | Senger | |
| 9,573,794 B2 * | 2/2017 | Park | B66B 23/028 |
| 9,850,099 B2 | 12/2017 | Hoopes et al. | |
| 2015/0307327 A1 * | 10/2015 | Srb-Gaffron | B66B 23/14 198/321 |
| 2017/0275139 A1 | 9/2017 | Turek et al. | |
| 2018/0222725 A1 * | 8/2018 | Turek | B66B 23/12 |

FOREIGN PATENT DOCUMENTS

| | | |
|---|---|---|
| EP | 1306342 A1 | 6/2000 |
| GB | 510029 A | 7/1939 |
| GB | 1171329 A | 11/1969 |

* cited by examiner

DRIVE SYSTEM FOR A PEOPLE CONVEYOR

FOREIGN PRIORITY

This application claims priority to European Patent Application No. 18172722.3, filed May 16, 2018, and all the benefits accruing therefrom under 35 U.S.C. § 119, the contents of which in its entirety are herein incorporated by reference.

BACKGROUND

The invention relates to a drive system for a people conveyor and to a people conveyor comprising such a drive system.

A people conveyor, such as an escalator or a moving walkway, comprises a band of conveyance elements, in particular steps or pallets, moving in a conveyance direction between two landing portions. The conveyance elements are connected with and driven by an endless conveyance chain belonging to a drive system. The conveyance chain comprises a plurality of chain links and extends along an endless loop between two turnaround portions arranged next to the landing portions.

At least one sprocket transferring the chain links between an upper conveyance portion and a lower return portion is provided in at least one of the turnaround portions. The diameter of said at least one sprocket is a limiting factor for reducing the vertical dimension of the people conveyor. The lower limit of the diameter of said at least one sprocket depends on the length of the chain links.

Thus, it would be beneficial to reduce the length of the chain links in order to allow reducing the diameter of the at least one sprocket and thus the vertical dimension of the people conveyor.

SUMMARY

Exemplary embodiments of the invention provide drive systems for a people conveyor comprising a plurality of conveyance elements, which are configured for traveling along an endless path between two opposite landings.

A drive system according to an exemplary embodiment of the invention comprises a conveyance chain including a plurality of chain links connected to each other; a plurality of legs configured for connecting the conveyance chain with the conveyance elements; and a plurality of levers. Each of the levers is pivotably connected to one of the chain links and to one of the legs, respectively. Each of the legs is connected to at least two different chain links by at least two of the levers, respectively.

The plurality of legs constitute an endless chain of legs extending substantially parallel to the conveyance chain. The chain of legs is movably connected with the drive chain by the pivotable levers.

Exemplary embodiments of the invention also include a people conveyor comprising a plurality of conveyance elements configured for traveling along an endless path between two opposite landings, and at least one drive system according to an exemplary embodiment of the invention, wherein the drive system is configured for driving the plurality of conveyance elements.

The legs of the drive system may be attached to or formed integrally with the conveyance elements of the people conveyor.

A drive system according to an exemplary embodiment of the invention allows reducing the pitch of the conveyance chain, i.e. the length of the chain links in the conveyance direction. The chain links in particular may be shorter than the conveyance elements.

The sprocket may have a diameter adapted to the pitch of the chain links. Thus, when a drive system according to an exemplary embodiment is employed, the diameter of the sprocket may be considerably smaller than the diameter of a sprocket of a conventional people conveyor, in which the sprocket is adapted to the pitch of the conveyance elements.

In consequence, the diameter of the turnaround portions, in particular the diameter of a sprocket arranged in at least one of the turnaround portions for passing the conveyance chain from an upper conveyance portion into a lower return portion may be reduced. As a result, a people conveyor comprising a drive system according to an exemplary embodiment needs less space, in particular in the vertical direction.

A number of optional features are set out in the following. These features may be realized in particular embodiments, alone or in combination with any of the other features.

Each of the legs may be connected to two non-adjacent chain links, respectively. This allows increasing the length of the legs beyond the length of the chain links.

A lever may be pivotably connected to every n-th of the chain link axles, with n being an integer larger than one (n>1).

The legs may be pivotably connected to the levers by lever axles extending orthogonally to the conveyance direction. Lever axles provide a reliable pivotable connection with low friction between the legs and the levers.

The drive system may further comprise leg rollers supported by the lever axles. The leg rollers may be supported and guided by at least one leg roller guide rail. Leg rollers guided by at least one leg roller guide rail allow defining the movement path of the lever axles by the shape of the at least one leg roller guide rail.

The drive system may comprise chain link axles connecting adjacent chain links. Each lever maybe pivotably connected to one of the chain link axles. This allows connecting the levers to the chain links easily without substantially modifying the chain links.

Each lever may comprise a first opening accommodating a chain link axle and a second opening accommodating a lever axle.

At least one of the first and second openings may be an elongated opening allowing the lever to move linearly with respect to the leg and/or with respect to chain link to which it is pivotably connected. Allowing a linear motion of the lever with respect to the leg and/or with respect to chain link adds an additional degree of freedom to the movement of the legs. This additional degree of freedom may be advantageous for adjusting the movement path of the legs to the respective requirements, in particular when the conveyance elements transfer from a linear movement path in the conveyance portion and the return portion into a curved movement path in the turnaround portions or vice versa.

Alternatively, the first and second openings both may be circular openings which do not allow for a sliding movement of the levers. In this case, as there is no additional degree of freedom, no leg rollers and leg roller guide rails are necessary for defining the movement path of the legs.

The conveyance elements of the people conveyor may be attached to at least one of the legs. Alternatively, the legs may be formed integrally with the conveyance elements. Forming the legs integrally with the conveyance elements facilitates the installation of the people conveyor, in particular since the number of parts to be assembled on site is reduced.

The drive system may comprise chain rollers attached to the chain links. The people conveyor may further comprise at least one chain roller guide rail configured for guiding the chain rollers along a desired path.

At least one conveyance element roller may be rotatably attached to each of the conveyance elements. The people conveyor may further comprise at least one conveyance element roller guide rail configured for guiding the conveyance element rollers. Such a configuration allows controlling the orientation of the conveyance elements while traveling along their movement path according to the respective needs by the shape of the conveyance element roller guide rail.

A people conveyor according to an exemplary embodiment of the invention may be an escalator in which the conveyance elements are steps; the steps in particular may be bucket steps, i.e. steps comprising tread plates and skirt panels laterally attached to the tread plates.

A people conveyor according to an exemplary embodiment of the invention also may be a moving walkway in which the conveyance elements are pallets.

DRAWING DESCRIPTION

In the following exemplary embodiments of the invention are described with reference to the enclosed figures.

DETAILED DESCRIPTION

Figure 1:
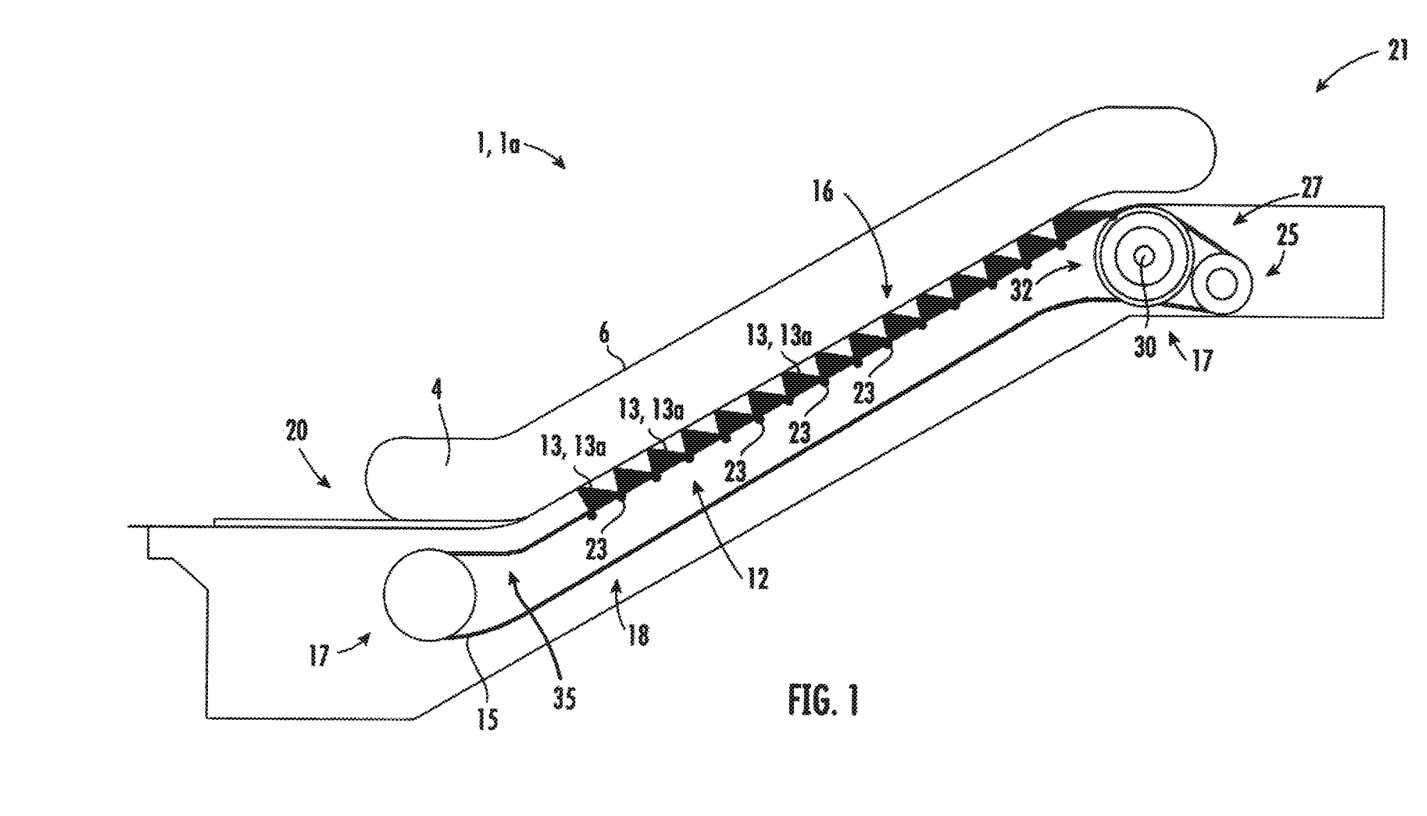
FIG. 1 depicts a schematic side view of an escalator.

FIG. 1 is a schematic side view of a people conveyor 1, in particular of an escalator 1a, comprising a band 12 of conveyance elements 13 (steps 13a) extending in a conveyance direction between a first (lower) landing portion 20 and a second (upper) landing portion 21.

In turnaround portions 17 next to the landing portions 20, 21, the band 12 of conveyance elements 13 passes from a conveyance portion 16 into a return portion 18, and vice versa. A conveyance chain 15 extending along a closed loop is connected to the band 12 of conveyance elements 13. The conveyance chain 15 comprises chain rollers 23 guided and supported by guide rails, which are not shown in FIG. 1.

For clarity of the illustration, only some of the conveyance elements 13 are depicted in FIG. 1. Further, not all of a plurality of identical features are always provided with reference signs in all figures.

The conveyance chain 15 is part of a drive system 35 configured for driving the band 12 of conveyance elements 13. The conveyance chain 15 is driven by a sprocket 32 mounted to a rotating shaft 30. A people conveyor drive 25 is configured for driving the rotating shaft 30 and in consequence the sprocket 32 and the conveyance chain 15 via a transmission element 27.

Balustrades 4 supporting moving handrails 6 extend parallel to the conveyance portion 16.

Figure 2:
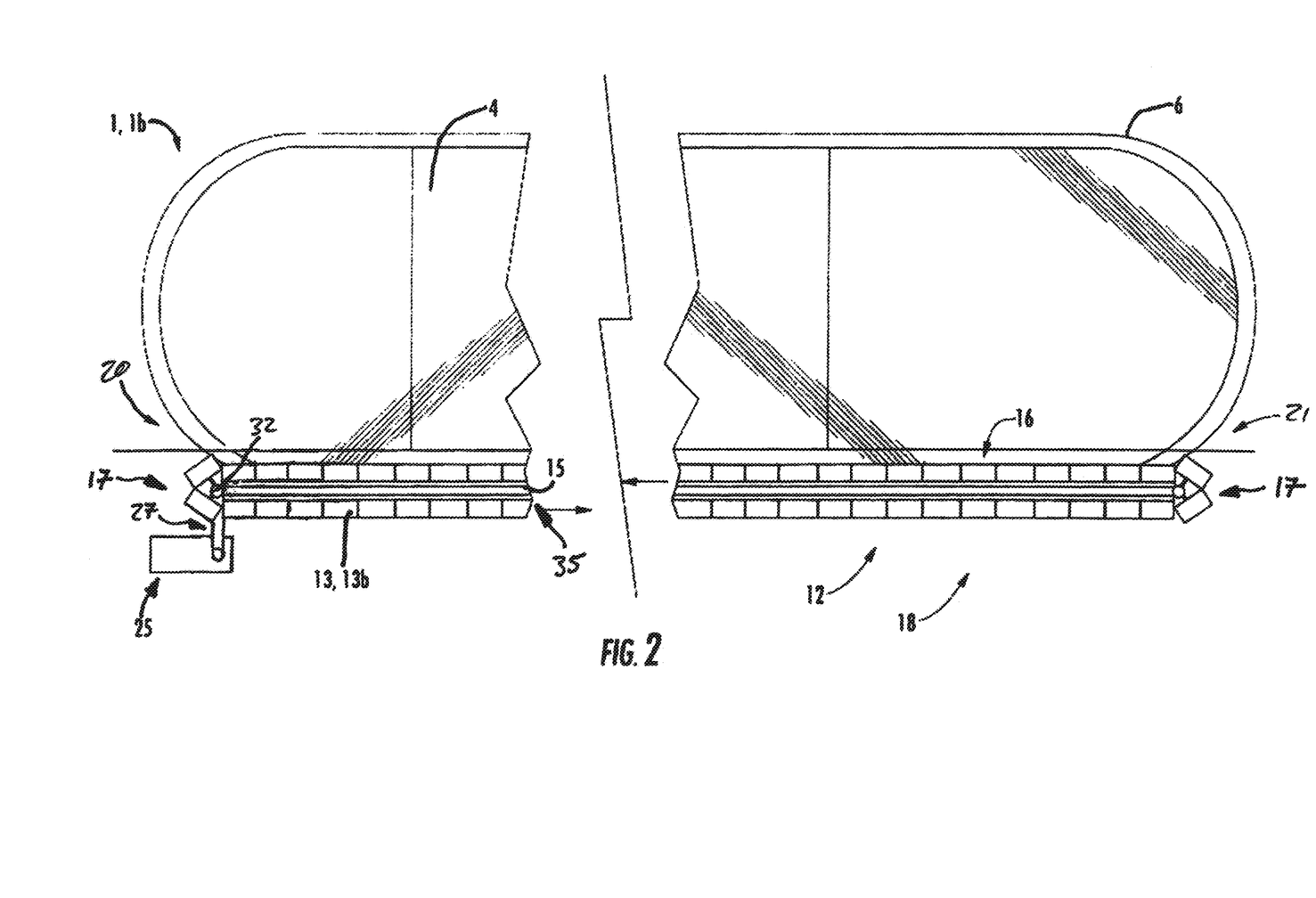
FIG. 2 depicts a schematic side view of a moving walkway.

FIG. 2 depicts a schematic side view of a people conveyor 1, which is provided as a moving walkway 1b.

The moving walkway 1b comprises an endless band 12 of conveyance elements 13 (pallets 13b) moving in a conveyance direction in an upper conveyance portion 16 and opposite to the conveyance direction in a lower return portion 18. First and second landing portions 20, 21 are provided at both ends of the moving walkway 1. In turnaround portions 17 next to the landing portions 20, 21 the band 12 of conveyance elements 13 passes from the conveyance portion 16 into the return portion 18, and vice versa. Balustrades 4 supporting moving handrails 6 extend parallel to the conveyance portion 16.

Similar to the embodiment shown in FIG. 1, the band 12 of conveyance elements 13 is connected with an endless conveyance chain 15, which is part of a drive system 35.

In at least one of the turnaround portions 17, the endless conveyance chain 15 is in engagement with a sprocket 32. When the moving walkway 1b is operated, the sprocket 32 is driven by a people conveyor drive 25 via a transmission element 27 for driving the conveyance chain 15.

In both embodiments depicted in FIGS. 1 and 2, the transmission element 27 may be a drive chain or a drive belt. The sprocket 32 may comprise two gear rims, a first gear rim engaging with the conveyance chain 15 and a second gear rim engaging with the transmission element 27. The first and second gear rims may have the same diameter/number of teeth, or the diameters/numbers of teeth of the two gear rims may be different.

Figure 3:
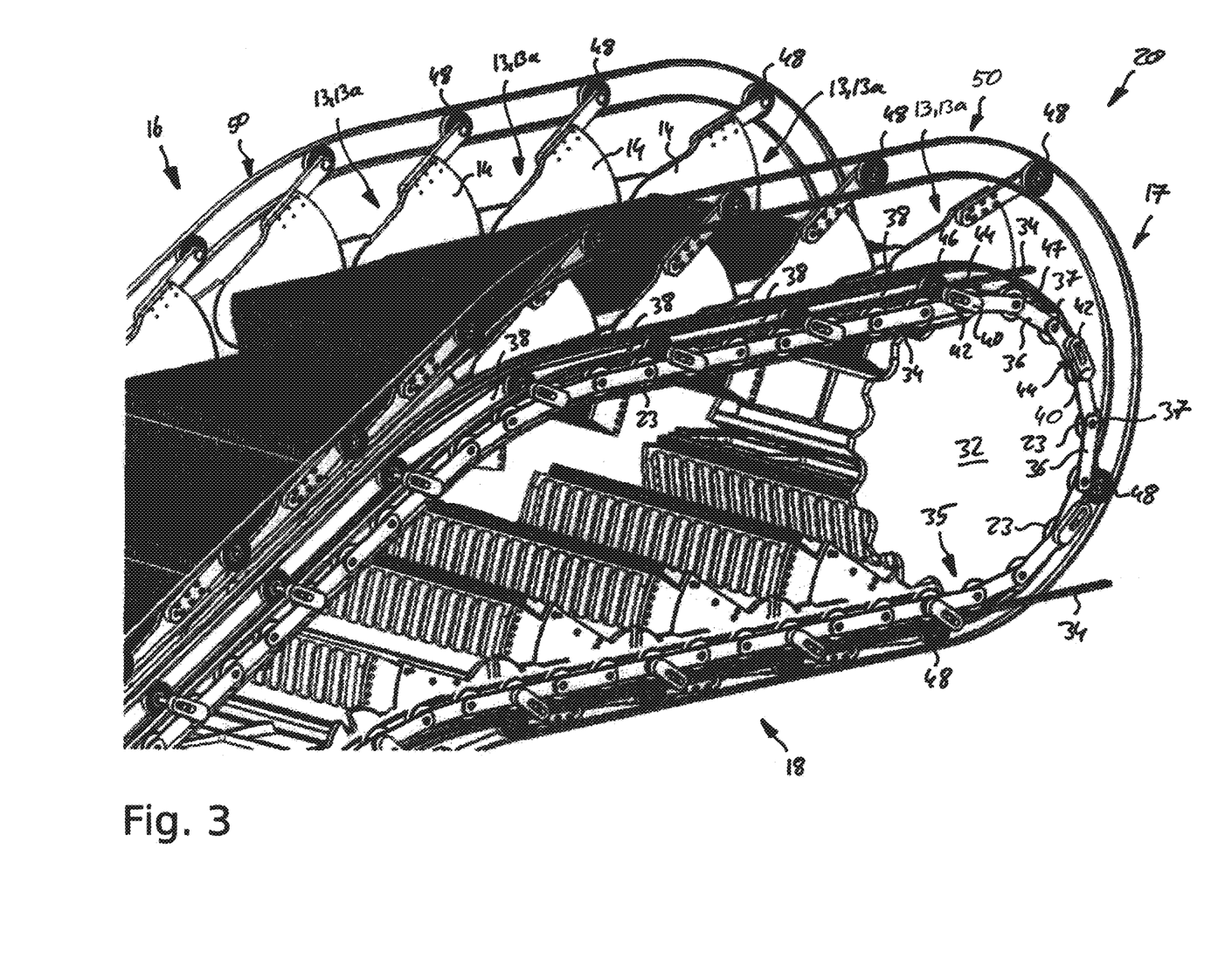
FIG. 3 depicts a perspective view of a drive system according to an exemplary embodiment of the invention.
Figure 4:
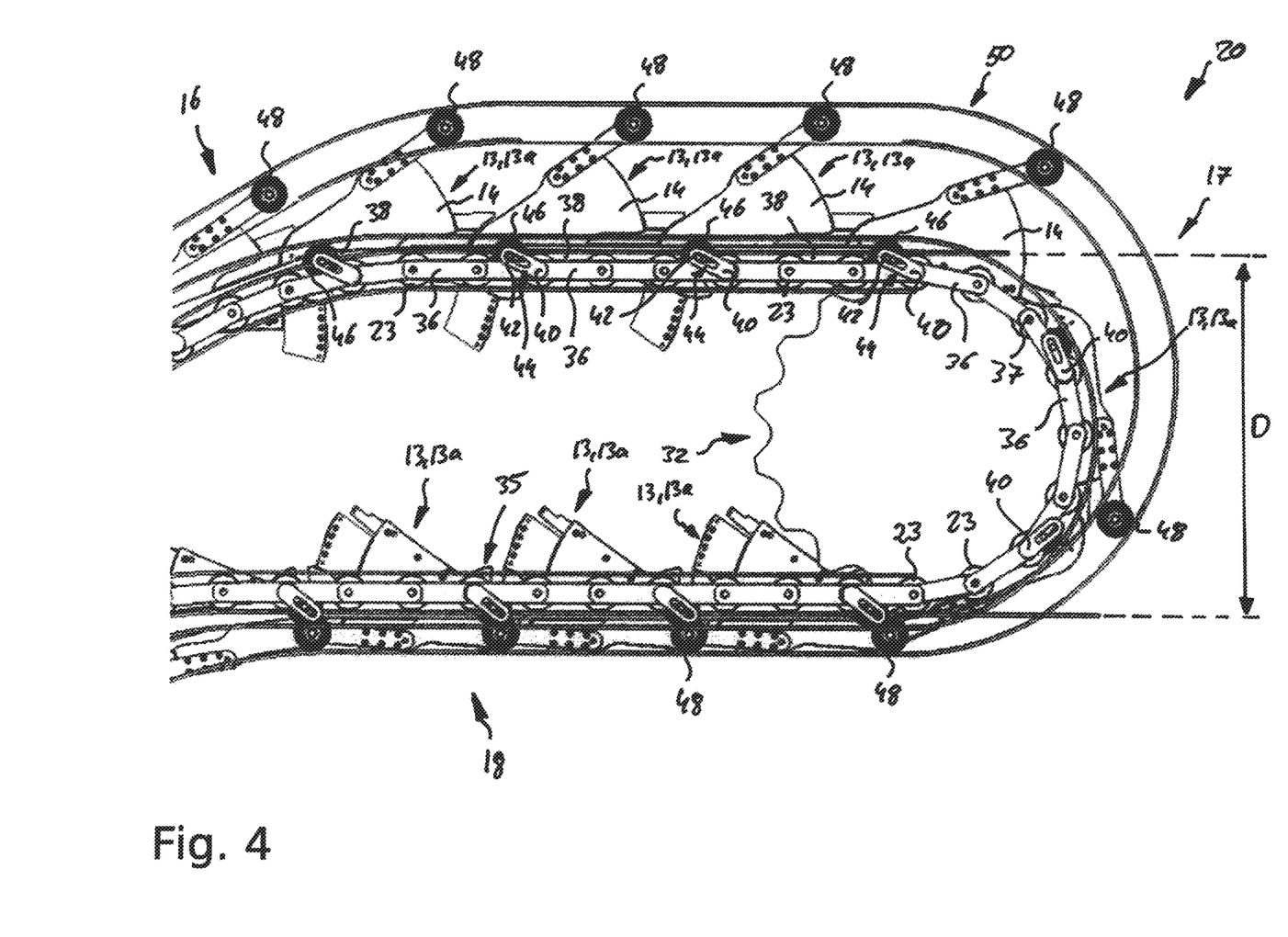
FIG. 4 depicts a side view of a portion of the drive system depicted in FIG. 3.
Figure 5:
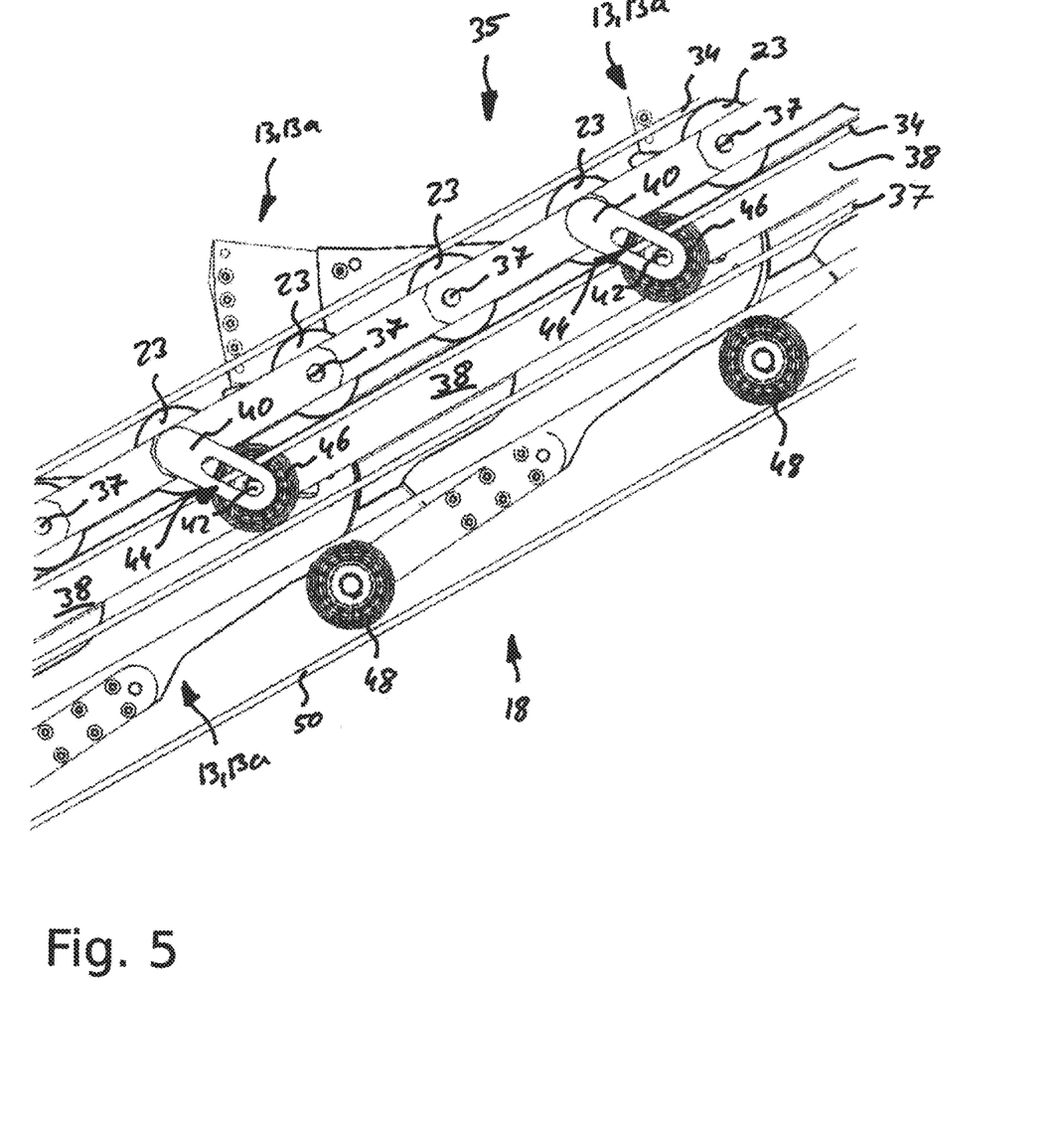
FIG. 5 depicts an enlarged partial side view of a portion of the drive system depicted in FIGS. 3 and 4.

FIG. 3 depicts a perspective view of a portion of the drive system 35 of an escalator 1a next to the turnaround portion 17 at the upper landing portion 20, and FIG. 4 depicts a side view thereof. FIG. 5 depicts an enlarged partial side view of a portion of the drive system 35 in the return portion 18 of the escalator 1a.

The conveyance chain 15, which is a component of the drive system 35, extends over and engages with the outer periphery of the sprocket 32 arranged in the turnaround portion 17. An additional, structurally identical, conveyance chain 15, which is not visible in the figures, extends parallel to the conveyance chain 15 shown in FIGS. 3 to 5.

The conveyance elements 13 (steps 13a) are arranged between the two conveyance chains 15. Each lateral side of the conveyance element 13 is mechanically connected with one of the conveyance chains 15, respectively. The detail of the connection between the conveyance elements 13 and the conveyance chains 15 will be discussed in more detail further below.

For linguistic simplicity and clarity, the following description refers to only one conveyance chain 15. The description, however, equivalently applies to the second conveyance chain 15, which is not visible in the figures.

The conveyance chain 15 comprises a plurality of chain links 36 pairwise connected with each other by means of chain link axles 37 extending orthogonally to the conveyance direction.

A chain roller 23 is rotatably supported by each of the chain link axles 37. In the turnaround portion 17, the chain rollers 23 are in engagement with the sprocket 32. In the conveyance portion 16 and in the return portion 18, the chain rollers 23 are guided and supported by at least one chain roller guide rail 34.

The drive system 35 further comprises a plurality of levers 40 mounted to the conveyance chain 15. In the embodiment depicted in FIGS. 3 to 5, a first end of each lever 40 is pivotably connected to every third chain link axle 37, respectively.

The chain link axles 37 in particular may extend through first openings (not shown) formed at the first end of each lever 40.

Connecting the levers 40 to every third of the chain link axles 37 is only exemplary. Generally, a lever 40 may be pivotably connected to every n-th of the chain link axles 37, wherein n is an integer larger than one (n>1).

Each lever 40 has a second end opposite to the first end. Legs 38 are pivotably connected to the second ends of the levers 40. In particular, two legs 38 extending in opposite directions basically parallel to the conveyance direction are pivotably connected to the second end of each lever 40. Thus, a leg 38 extends between each pair of adjacent levers 40, respectively.

As a result, the legs 38 form an endless chain of legs 38 extending substantially parallel to the conveyance chain 15 and being movably connected to the conveyance chain 15 by the pivotable levers 40.

In the linear portions of the movement path, in particular in the conveyance portion 16 and in the return portion 18, the legs 38 extend basically parallel to the chain links 36. The legs 38, however, are movable with respect to the conveyance chain 15 by pivoting the levers 40 so that the levers 40 may be oriented non-parallel to the chain links 36 in the curved potions of the movement paths, in particular in the turnaround portions 17 and in transition portions connecting the turnaround portions 17 with the conveyance portions 16 and/or with the return portions 18, respectively.

The legs 38 are arranged between the conveyance chain 15 and the conveyance elements 13. Thus, in FIGS. 3 and 4, the legs 38 are barely visible as they are covered almost completely by the sprocket 33.

The legs 38 in particular are pivotably connected to the levers 40 by leg axles 42 mounted to the legs 38 and extending through second openings 44 formed at the second end of each lever 40 (see FIG. 5).

In the embodiment depicted in FIGS. 3 to 5, the second openings 44 formed at the second ends of the levers 40 are elongated second openings 44 allowing the leg axles 42 not only to rotate with respect to the levers 40, but also to move linearly along the longitudinal extension of the respective lever 40. Allowing such a linear movement of the leg axles 42 adds a further degree of freedom to the movement of the legs 38 with respect to the chain links 36.

Alternatively or additionally, the first openings (not shown) formed within the levers 40 for accommodating the chain link axles 37 may be elongated first openings allowing the levers 40 to move linearly with respect to the conveyance chain 15.

Each of the leg axles 42 supports a leg roller 46. The leg rollers 46 are guided and supported by leg roller guide rails 47 defining the movement path of the leg axles 42 and thereby the orientation of the legs 38 with respect to the conveyance chain 15.

The length of the legs 38 in the conveyance direction basically corresponds to the length of the conveyance elements 13, so that the legs 38 have the same pitch as the conveyance elements 13. Each conveyance element 13 is mounted to one of the legs 38, respectively. In an alternative configuration, the legs 38 may be formed integrally with the conveyance elements 13.

As the people conveyor 1 depicted in FIGS. 3 to 5 is an escalator 1*a*, the conveyance elements 13 are steps 13*a*. In such a configuration, the legs 38 may be mounted to, or formed integrally with, risers of the steps 13*a*.

The steps 13*a* may be bucket steps 13*a* comprising tread plates 11 and skirt panels 14 laterally attached to the tread plates 11. The skirt panels 14 may be rotatable with respect to the risers of the steps 13*a*.

The steps 13*a* further comprise conveyance element rollers (step roller) 48 mounted to the skirt panels 14 and guided by at least conveyance element roller guide rail (step roller guide rail) 50. The shape of the conveyance element roller guide rails 50 defines the orientation of the steps 13*a* with respect to the drive chain 15.

As illustrated in FIGS. 3 and 4, in the conveyance portion 16, the steps 13*a* are oriented in an "expanded orientation" forming a flight of stairs. In the return portion 18, the steps 13*a* are "folded in" forming a flat band of conveyance elements 13.

Connecting the conveyance elements 13 to the conveyance chain 15 by movable legs 38 according to exemplary embodiments of the invention allows reducing the pitch of the conveyance chain 15, i.e. the length of the chain links 36 in the conveyance direction. The chain links 36 in particular may be shorter than the conveyance elements 13. In consequence, the drive system 35 comprises more chain links 36 than legs 38/conveyance elements 13.

Due to the reduced length of the chain links 36, the conveyance chain 15 may follow a smaller radius in the turnaround portions 17. Thus, the diameter D of the at least one sprocket 32 (see FIG. 4) and in consequence the vertical extension of the turnaround portions 17 may be reduced compared to a conventional configuration. As a result, the people conveyor 1 comprising a drive system 35 according to an exemplary embodiment of the invention needs less space, in particular in the vertical direction.

Increasing the number of chain links 36 with respect to the number of conveyance elements 13 further reduces the undesirable polygonal effect generated by the engagement of the conveyance chain 15 with the sprocket 32.

Figure 6:
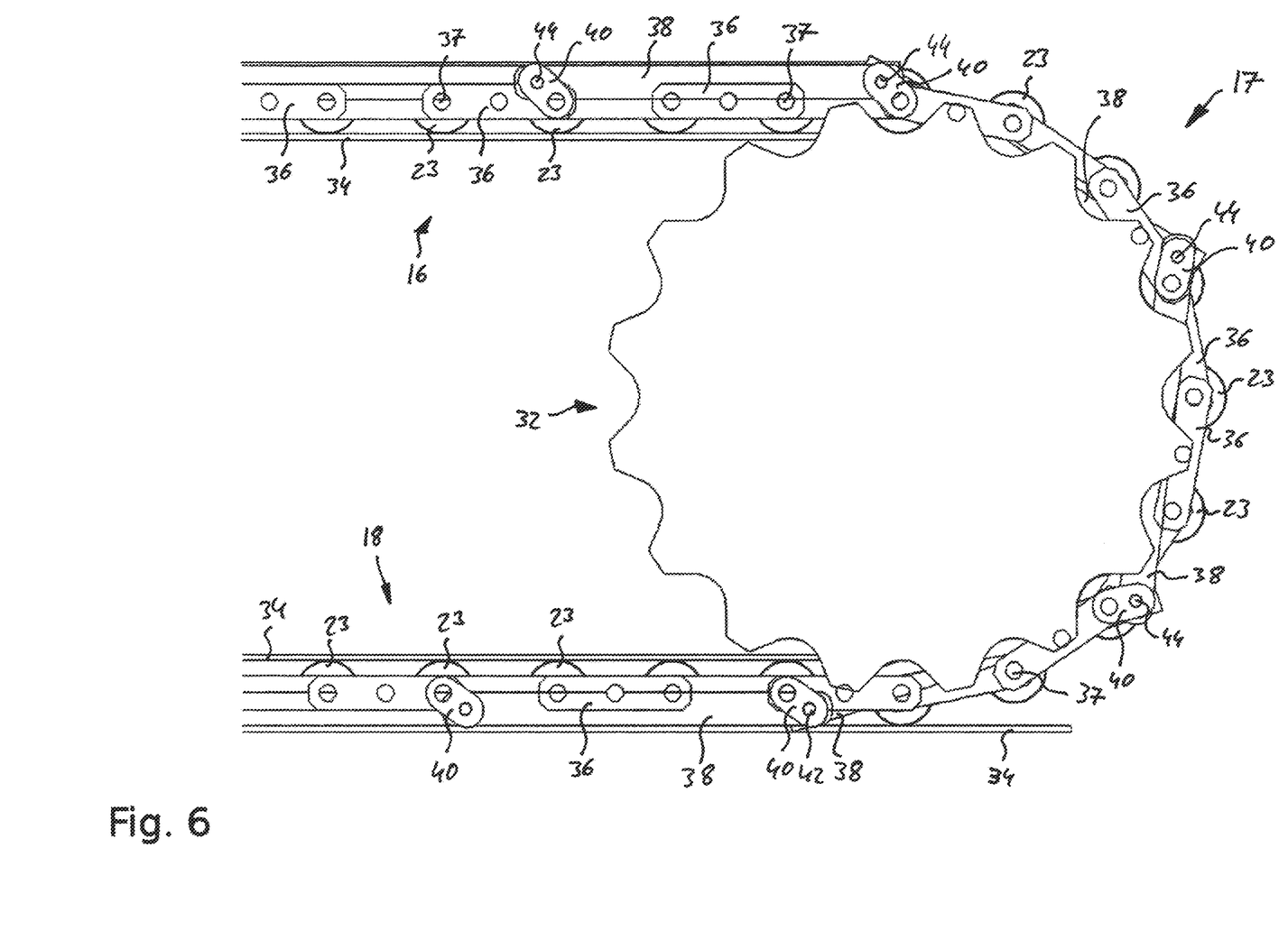
FIG. 6 depicts a side view of a turnaround portion of a drive system according to another embodiment of the invention.
Figure 7:
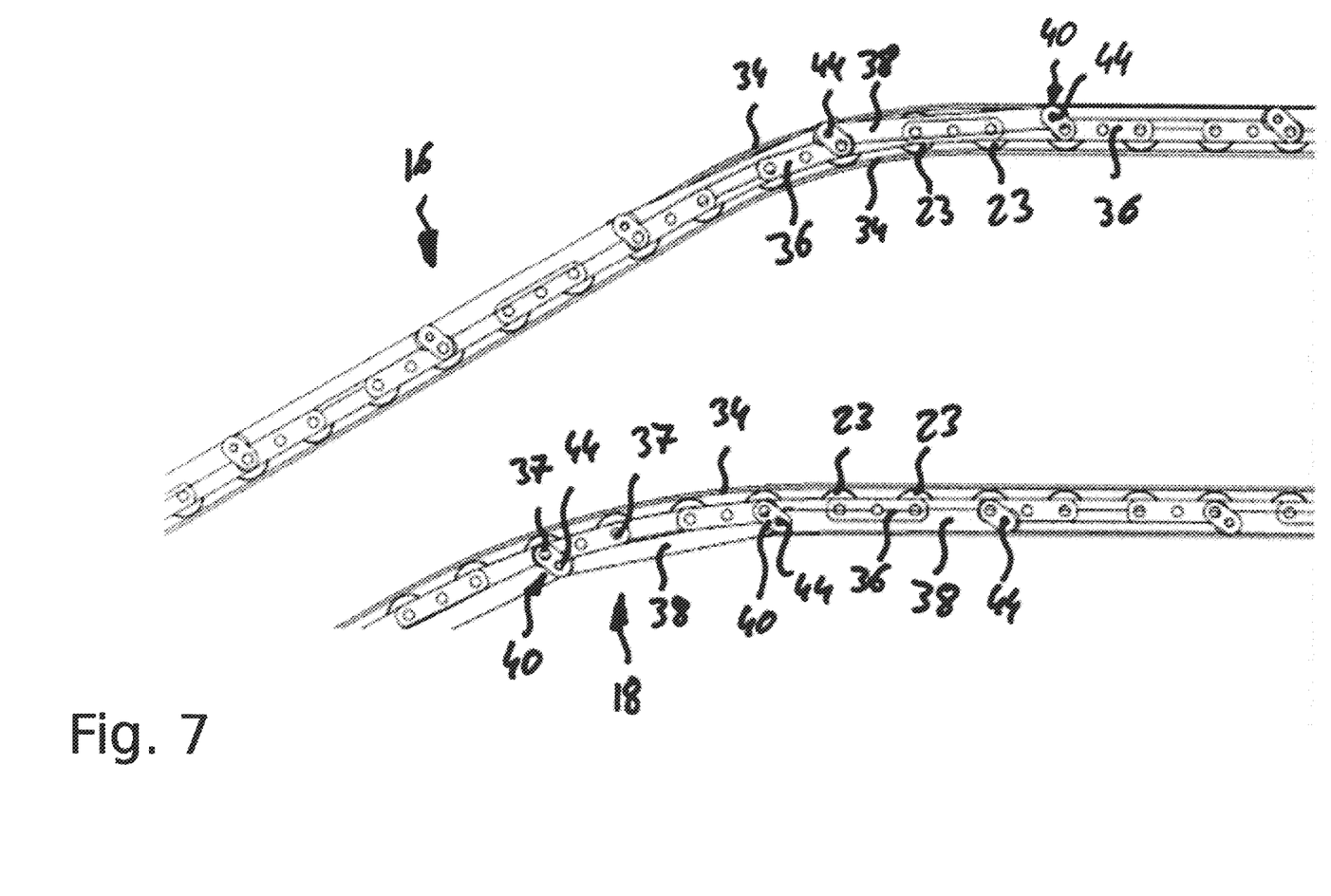
FIG. 7 depicts a side view of a section of the conveyance portion and of the return portion of the drive system depicted in FIG. 6.

FIGS. 6 and 7 illustrate a drive system 35 according to an alternative embodiment of the invention.

FIG. 6 depicts a side view of a turnaround portion 17 of the drive system 35, and FIG. 7 depicts a side view of a section of the conveyance portion 16 and of the return portion 18, respectively.

The components of the drive system 35 according to the alternative embodiment are basically the same as the components depicted in and described with reference to FIGS. 3 to 5. Identical features are not described in detail again.

The drive system 35 depicted in FIGS. 6 and 7 differs from the drive system 35 depicted in FIGS. 3 to 5 in that the second openings 44 formed at the second ends of the levers 40 are not elongated but have a circular shape. The second openings 44 are formed with a diameter which allows the leg axles 42 introduced into said second openings 44 to rotate but not to move linearly with respect to the levers 40.

In consequence, in a drive system 35 according to the embodiment of the invention depicted in FIGS. 6 and 7, there is less freedom for the legs 38 to move with respect to the chain links 36.

In such an embodiment, no leg rollers 46 and leg roller guide rails 47 defining the movement path of the legs 38 are provided, since the movement path of the legs 38 is definitely set by the movement path of the chain link axles 37 and by the movement path of the conveyance element rollers 48 which are not shown in FIGS. 6 and 7.

Although drive systems 35 according to exemplary embodiments of the invention have been described in the context of an escalator 1a, the skilled person understands that a drive system 35 according to an exemplary embodiment of the invention may be similarly employed in a moving walkway 1b as depicted in FIG. 2.

In case of a moving walkway 1b, the conveyance elements 13 are pallets 13a, and the conveyance element rollers 48 and the conveyance element roller guide rails 50 are pallet rollers and pallet roller guide rails, respectively.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 1 people conveyor
1a escalator
1b moving walkway
4 balustrade
6 moving handrail
11 tread plates
12 band of conveyance elements
13 conveyance elements
13a steps
13b pallets
14 skirt panels
15 conveyance chain
16 conveyance portion
17 turnaround portion
18 return portion
20 first landing portion
21 second landing portion
22 guide rails
23 chain roller
25 people conveyor drive
27 transmission element/second drive chain
29 brake
30 rotating shaft
32 sprocket
34 chain roller guide rail
35 drive system
36 chain link
37 chain link axle
38 leg
40 lever
42 leg axle
44 second opening
46 leg roller
47 leg roller guide rail
48 conveyance element roller
50 conveyance element roller guide rail

What is claimed is:

1. Drive system (35) for a people conveyor (1) comprising a plurality of conveyance elements (13) configured for traveling along an endless path between two opposite landings (20, 21), the drive system (35) comprising:
a conveyance chain (15) including a plurality of chain links (36) connected to each other;
a plurality of legs (38) configured for connecting the conveyance chain (15) with the conveyance elements (13); and
a plurality of levers (40);
wherein each of the levers (40) is pivotably connected to one of the chain links (36) and pivotably connected to one of the legs (38), respectively; and
wherein each leg (38) is connected to at least two different chain links (36) by at least two of the levers (40).

2. Drive system (35) according to claim 1, wherein the legs (38) constitute an endless chain of legs (37) extending substantially parallel to the conveyance chain (15).

3. Drive system (35) according to claim 1, wherein each leg (38) is connected to two non-adjacent chain links (36).

4. Drive system (35) according to claim 1, wherein a lever (40) is pivotably connected to every n-th of the chain link axles (37), with n being an integer larger than one.

5. Drive system (35) according to claim 1, wherein the legs (38) are pivotably connected to the levers (40) by lever axles (42), wherein the drive system in particular comprises leg rollers (46) supported by the lever axles (42).

6. Drive system (35) according to claim 1, comprising chain link axles (37) connecting adjacent chain links (36), wherein each lever (40) in particular is pivotably connected to one of the chain link axles (37).

7. Drive system (35) according to claim 1, wherein each lever (40) comprises a first opening accommodating a chain link axle (37) and a second opening (44) accommodating a lever axle (42).

8. Drive system (35) according to claim 7, wherein at least one of the first and second openings (44) is an elongated opening (44) allowing the lever (40) to move linearly with respect to the leg (38) and/or with respect to chain link (36) with which it is pivotably connected.

9. People conveyor, comprising a plurality of conveyance elements (13) configured for traveling along an endless path between two opposite landings (20, 21) and at least one drive system (35) according to claim 1,
wherein each conveyance element (13) is attached to at least one of the legs (38).

10. People conveyor comprising a plurality of conveyance elements (13) configured for traveling along an endless path between two opposite landings (20, 21) and at least one drive system (35) according to claim 1,
wherein the legs (38) are formed integrally with the conveyance elements (13).

11. People conveyor according to claim 9, further comprising leg rollers (46) supported by the lever axles (42) and at least one leg roller guide rail configured for guiding the leg rollers (46).

12. People conveyor according to claim 9, further comprising chain rollers (23) attached to the chain links (36) and at least one chain roller guide rail (34) configured for guiding the chain rollers (37).

13. People conveyor according to claim 9, wherein at least one conveyance element roller (48) is rotatably attached to each of the conveyance elements (13), and wherein the people conveyor (1) comprises a conveyance element roller guide rail (50) configured for guiding the conveyance element rollers (48).

14. People conveyor according to claim 9, wherein the people conveyor (1) is an escalator (1a) and the conveyance elements (13) are steps (13a), in particular bucket steps (13a) comprising tread plates (11) and skirt panels (14) laterally attached to the tread plates (11).

15. People conveyor according to claim 9, wherein the people conveyor (1) is a moving walkway (1*b*) and the conveyance elements (13) are pallets (13*b*).

\* \* \* \* \*